Figure 1:
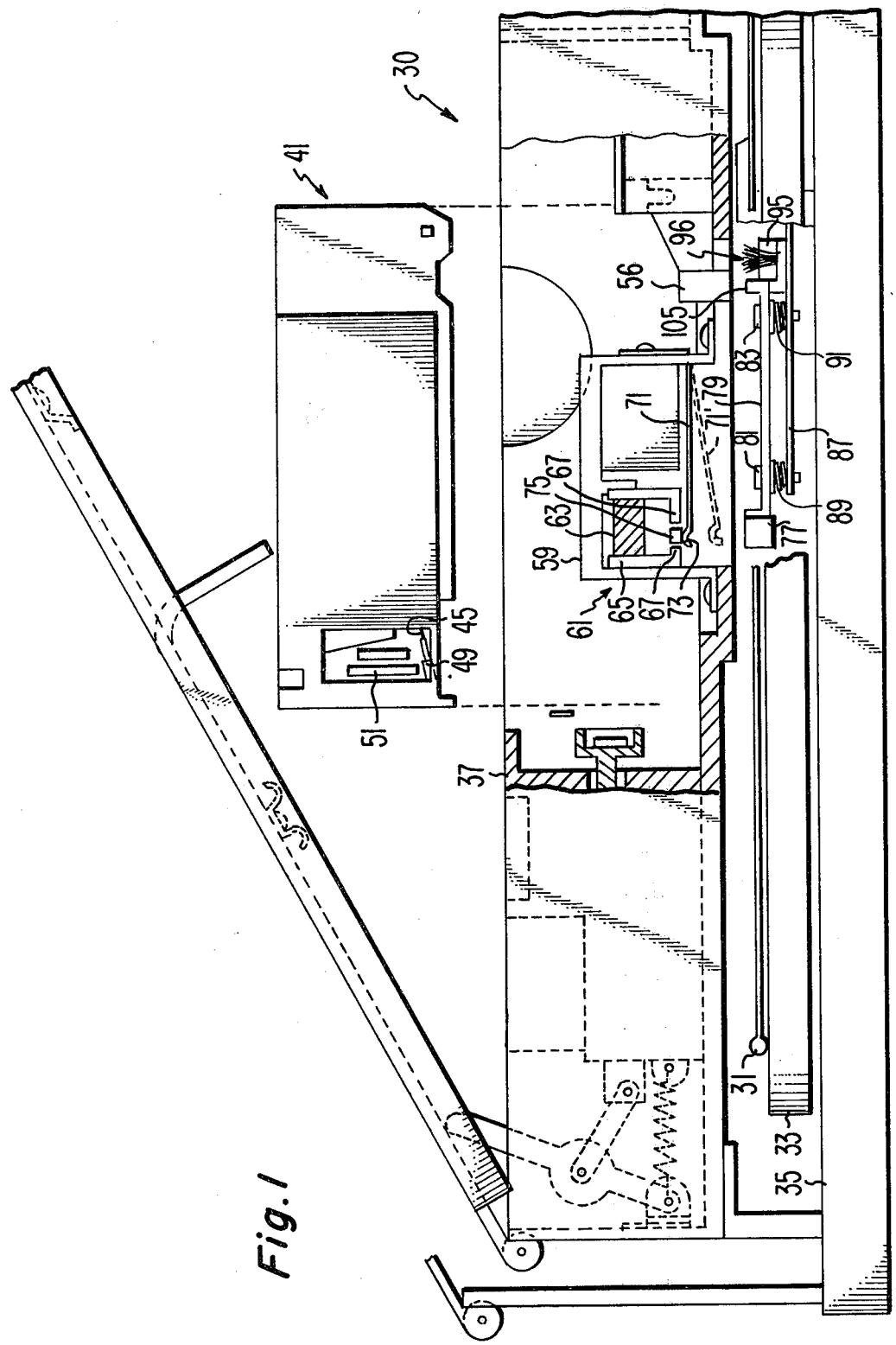

United States Patent [19]

Allen et al.

[11] 4,128,247

[45] Dec. 5, 1978

[54] STYLUS POSITION CONTROL SYSTEM

[75] Inventors: James A. Allen, Monrovia; Clyde F. Coleman, Crawfordsville, both of Ind.

[73] Assignee: RCA Corporation, New York, N.Y.

[21] Appl. No.: 768,591

[22] Filed: Feb. 14, 1977

[51] Int. Cl.² .............................................. G11B 3/10
[52] U.S. Cl. ............................... 274/23 R; 274/23 B; 358/128
[58] Field of Search ................. 274/23 R, 23 A, 23 B, 274/37; 358/128

[56] References Cited
U.S. PATENT DOCUMENTS 4,040,635  8/1977  Leedom ................................. 274/37

Primary Examiner—Steven L. Stephan
Attorney, Agent, or Firm—Eugene M. Whitacre; Wm. H. Meagher; Joseph S. Tripoli

[57] ABSTRACT

A stylus arm, pivotally mounted at one end within a stylus housing, supports a stylus at its free end. A stylus arm rest including a permanent magnet is mounted in the stylus housing for movement between an elevated position and a depressed position. The housing is subject to translatory motion between a rest position, clear of a disc record supporting turntable, and playback positions over the turntable. A brush is mounted in proximity to the turntable and beneath the path of travel of the housing, with the bristles of the brush extending, from a holder which is mounted on a height adjustable platform, in directions substantially perpendicular to the direction of housing travel. As the housing reaches an intermediate position in passage toward the rest position, the stylus arm rest is depressed when the permanent magnet affixed thereto is attracted by a second permanent magnet mounted on the platform. The depression of the stylus arm rest causes the stylus arm to assume a lowered position where the stylus arm is supported by a guide mounted on the platform. During completion of the passage from the intermediate position to the rest position, the stylus arm slides over the guide allowing the stylus to pass through the brush bristles which clean debris therefrom; at the rest position, the stylus will be supported by the guide at an elevation substantially corresponding to the stylus elevation obtained during disc record engagement in the course of playback.

8 Claims, 4 Drawing Figures

STYLUS POSITION CONTROL SYSTEM

The present invention relates generally to stylus position control systems, and particularly to a stylus position control system which is suitable for aiding the implementation of functions, such as stylus arm attitude control, stylus arm lowering and lifting, stylus cleaning, etc., in video disc players of the type described in U.S. Pat. No. 3,842,194, issued to Jon K. Clemens.

In the Clemens player, a stylus, formed of an insulating support (which bears a conductive coating serving as an electrode), is supported at one end of a stylus arm. The arm end remote from the stylus is pivotally mounted within a housing. During playback of a record disc, the housing is driven in a radial direction over a turntable, supporting the record disc, enabling the stylus tip to maintain a substantially constant attitude in the successive convolutions of the disc groove. As geometrical variations in the groove bottom, representative of the recorded information, pass beneath the stylus tip, the capacitance formed between the stylus electrode and a conductive coating (underlying a dielectric coating) on the disc surface is varied. Suitable pickup circuitry convert the capacitance variations to electrical signals which may be processed for application to a television receiver to display the recorded information. At the termination of playback, the housing returns to an offturntable rest position.

In a player of the Clemens type, an electrically actuated arrangement, as described in copending U.S. patent application Ser. No. 667,309 — Bleazey, et al., may advantageously be used to effect lowering of the stylus arm by energizing a coil mounted within the stylus housing to downwardly repell a permanent magnet mounted to a stylus arm rest. The lowering of the stylus arm permits stylus reception in the disc groove during disc playback. During housing travel to and from a selected playback set-down position, however, the electrical actuation is removed so as to provide an elevated position for the stylus arm, retracting the stylus within the housing (so as to clear, for example, the disc record's outer bead). Moreover, the Bleazey, et al. arrangement seeks to avoid maintenance of the elevated arm position during rest (in order that a compliant support element for the arm may not develop a "set" that would subsequently interfere with proper arm motion achievement). To this end, an additional mechanical actuation of a stylus arm lowering action is effected as the housing approaches its rest position, and is maintained during housing occupancy of the rest position, so that the arm may assume its normal "play" position during rest.

In the course of playback operations of a player of the Clemens type, an accumulation of debris of various forms (e.g., particles of material fragmented from stylus or disc) on the stylus tip can develop which may interfere with proper sensing of the minute groove bottom variations. Pursuant to an approach described in copending U.S. application Ser. No. 667,386 — Kirschner, a system for cleaning the stylus tip, during passage of the housing to and from the playback positions, includes a brush mounted in proximity to the turntable beneath the path of travel of the housing. The bristles of the brush, which extend from a holder in directions substantially parallel to the direction of housing travel, engage the stylus tip during said passage to effect a cleaning thereof.

Stylus position control, in accordance with the principles of the present invention, provides improved performance of the aforementioned player functions, i.e., the stylus arm lowering during rest feature of Bleazey, et al. and the stylus tip cleaning of Kirschner.

In accordance with one aspect of the present invention, the position of the stylus arm and therefore the position of the stylus is controlled so that the stylus is maintained at an elevation in which the stylus arm assumes its normal "play" position for the entire duration of housing travel between the rest position and a position intermediate the rest position and the playback positions and including housing occupancy of the rest position.

In accordance with another aspect of the present invention, support of the stylus at such an elevation during said housing travel is advantageously employed to bring the stylus into engagement with the bristles of a stylus cleaning brush. Since stylus elevation is controlled throughout said housing travel, stylus engagement with the brush can be readily regulated, by adjusting the brush, to achieve a desired cleaning effect.

In accordance with yet another aspect of the present invention, the control of stylus elevation during said housing travel is selectively adjustable to compensate for errors due to the player's inherent mechanical tolerances (e.g., the distance between the stylus arm housing and the base). This selective adjustability feature greatly simplifies the manufacturing process for that portion of the player. By supporting the brush on means which is responsive to the selective adjustment of the elevation of the stylus, the relative positions of the stylus and the brush can be made independent of elevation adjustment to maintain the aforementioned desired cleaning effect.

In accordance with another aspect of the present invention, the actuation of a stylus lowering action, effected as the housing approaches the intermediate position through mechanical means by Bleazey, et al., is accomplished by non-mechanical means. Illustratively, the stylus lowering action is effected by means of a second permanent magnet mounted beneath the path of travel of the housing and adjacent to the housing rest position. As the stylus housing reaches the intermediate position in passage toward the rest position, a permanent magnet, mounted to the stylus arm rest, is attracted by the second permanent magnet, causing the stylus arm rest to be depressed and therefore allowing the stylus arm to be lowered and to remain lowered during further travel to and from, and including occupancy of, the rest position.

In an illustrative embodiment of the present invention, stylus position control is achieved by means of a rigid guide supported beneath the path of travel of the housing and extending, laterally with respect to the stylus arm, from the intermediate position to the housing rest position. Illustratively, the guide is carried by a platform which is mounted to the base by means of spring shrouded screws to control the elevation of the guide. Advantageously, the brush holder is also supported on the platform so that the relative positions of the guide and the brush are independent of platform height adjustment. By also mounting the permanent magnet on the platform selective adjustment of the elevation of the permanent magnet is readily achieved by means of the elevation controlling screws. In addition, by combining the stylus elevation control and stylus cleaning functions in one novel unitized assembly able to accommodate a wide range of manufacturing tolerances, the player manufacturing process is greatly simplified.

Figure 2:
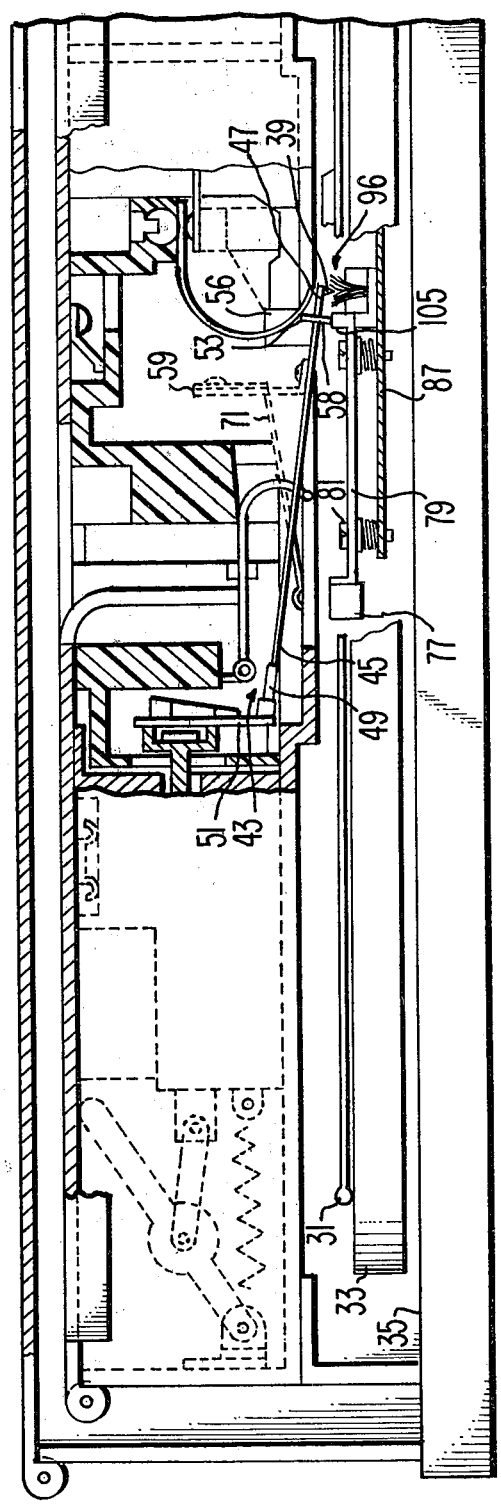
Figure 3:
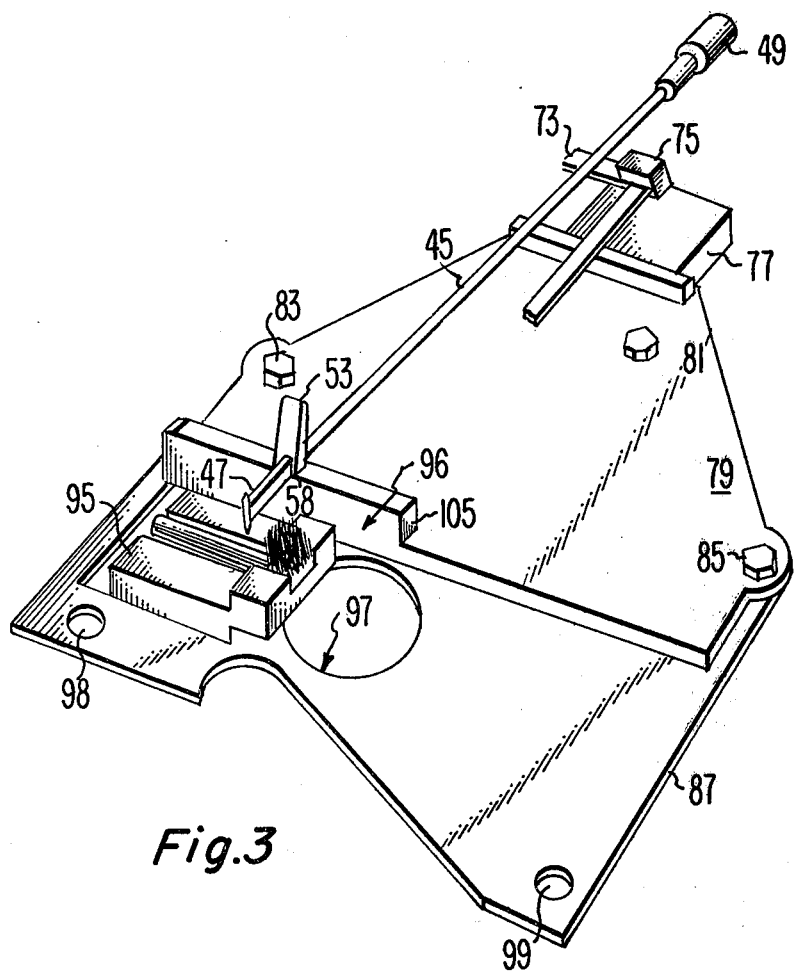
Figure 4:
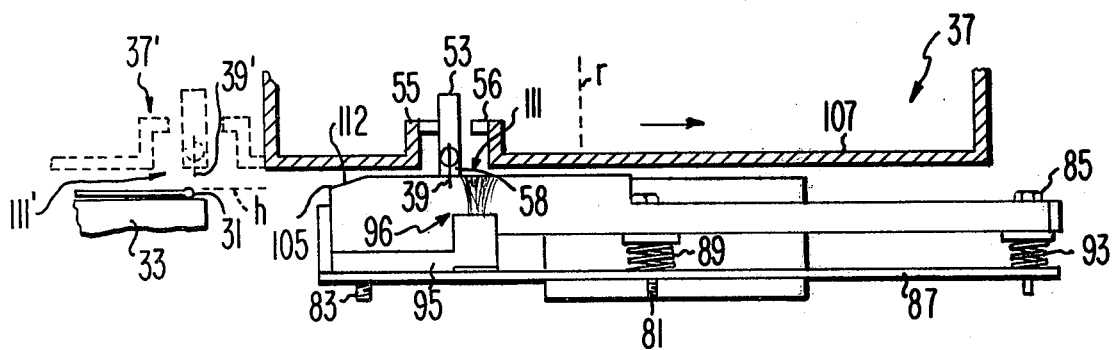

In the accompanying drawings:

FIG. 1 provides a side view of a video disc player, a portion of the stylus housing of the player being removed to expose a stylus position control apparatus pursuant to the principles of the present invention; a cartridge enclosing a stylus arm unit being shown outside the stylus housing;

FIG. 2 provides a side view of the player of FIG. 1, showing the stylus arm rest in the depressed position supported by a platform mounted guide;

FIG. 3 provides a plan view of the stylus position control apparatus of FIG. 1 in association with cooperating apparatus of a video disc player; and FIG. 4 provides a side view of the stylus position control apparatus of FIG. 1 in association with cooperating apparatus of a video disc player.

With reference now to FIGS. 1 and 2, FIG. 1 illustrates a side view of a video disc player 30 in accordance with the aforementioned Clemens patent. A disc record 31 is disposed for playback on a turntable 33 rotatably mounted on a base 35. A stylus housing 37 (broken away to show a stylus arm lifting/lowering apparatus) is mounted for lateral motion relative to the base 35 in correlation with lateral motion of a stylus 39 (FIG. 2) riding in a spiral-groove disposed on the surface of the record 31 during playback. Slots (not shown) are provided in the base 35 to permit lateral motion of the stylus housing 37 from an off-record rest position to above-record playback positions. Reference may be made to U.S. Pat. No. 3,870,835, to Stave, for an illustration of an apparatus for laterally driving the stylus housing 37 in correlation with the groove-riding stylus 39 during playback. A replaceable stylus arm cartridge 41 (shown outside the stylus housing 37) houses an insert molded stylus arm unit 43 (shown in FIG. 2). The insert molded stylus arm unit 43 consists of a stylus arm 45 formed of an aluminum tube (e.g., 0.024 inch outer diameter and 0.002 inch thickness) with a plastic stylus holder 47 molded at one end of the stylus arm and a compliant member 49 molded at the other end of the stylus arm to connect the stylus arm with a metal connector plate 51. The compliant member 49 is in unstressed condition when it is aligned with the stylus arm 45. The plastic stylus holder 47 contains a slot to hold the stylus 39 when it is affixed in place. A first small projection 53 is molded at the top of the plastic stylus holder 47 to engage with "stonewalls" 55, 56 to relieve the stylus 39 from a locked groove. A second small projection 58, smaller than the first projection 53, is molded at the bottom of the plastic stylus holder 47, the purpose of which second projection will be explained hereinafter. Reference may be made to the U.S. Pat. No. 3,961,131 — Taylor for an example of a locked groove escape arrangement. Reference may also be made to the aforementioned Bleazey, et al. application for an example of an arrangement for suspending the stylus arm unit 43 in the stylus arm cartridge 41.

The stylus arm lifting/lowering arrangement of the present invention will now be described. The arrangement includes a support structure 59 which is mounted within the stylus housing compartment 37 as shown in FIG. 1. An electromagnet 61 is secured to the structure 59. The electromagnet 61 comprises a coil 63 wound about a magnetizable core 65. The magnetizable core 65 includes a pair of pole pieces 67 which define an air gap.

The ends of the coil 63 are connected by a pair of terminals to an appropriate electrical supply (not shown).

One end of a leaf spring 71 is secured to the structure 59. The free end of the leaf spring 71 carries a stylus arm rest 73. The leaf spring 71 permits motion of the stylus arm rest 73 between an elevated position (shown in solid lines) and a depressed position (shown in broken lines 71'). The stylus arm rest 73 in the elevated position supports the stylus arm 45 in a raised position which position precludes stylus/record contact when the stylus housing 37 is in one of the playback positions.

The stylus arm rest 73 in the depressed position permits the stylus arm 45 to occupy a lowered position (FIG. 2). The lowered position of the stylus arm establishes stylus/record contact when the stylus housing 37 is in the above-record play position.

Further, the angle between the compliant member 49 and the connector plate 51, during containment of the cartridge 41 in the stylus housing 37, is such that when the stylus arm 45 is in the lowered position, the compliant member is aligned with the stylus arm (and hence the compliant member is unstressed).

A permanent magnet 75 is secured to the stylus arm rest 73 such that when the stylus arm rest is in the elevated position the permanent magnet is in close proximity to the air gap formed by pole pieces 67 and 67'.

The electrical supply provides a ramp voltage across the terminals causing a controlled current of a given polarity to flow through the coil 63. The controlled current in the coil 63 establishes an electromagnetic flux gradient in the air gap.

The orientation of the permanent magnet 75 relative to the air gap is such that the permanent magnet 75 is repelled away from the gap in the presence of the controlled current of the given polarity in the coil 63. The electromagnetic repulsion of the permanent magnet 75 out of the air gap causes the stylus arm rest 73 to assume the depressed position. An example of a circuit for generating the ramp voltage is provided in the aforementioned Bleazey, et al. application.

The stylus arm lifting/lowering apparatus further comprises a second permanent magnet 77 affixed to one end of a platform 79. A desired location of the platform 79 in the player places the second permanent magnet 77 beneath the path of travel of the stylus housing 37 from the vicinity of the turntable 33 to its off-record rest position and near the rest position of the stylus arm rest 73. The location of the second permanent magnet 77 on the platform 79 and the magnetic strength thereof are chosen such that when the stylus housing 37 reaches an intermediate position in passage from the playback positions toward the off-record rest position, the permanent magnet 75 affixed to the stylus arm rest 73 is downwardly attracted by the platform mounted permanent magnet 77 causing the stylus arm rest 73 to be depressed thus lowering the stylus arm 45.

Platform 79 is mounted by means of spring shrouded screws 81, 83, 85 to a base 87 which is in turn attached to board 35. Screws 81, 83 and 85, which are spaced apart in a triangular configuration, react against respective springs 89, 91, 93, which are located between the platform 79 and the base 87, to allow a vertical height adjustment of the platform 79 relative to the base 87 and hence relative to the board 35. As illustrated in FIG. 3 two of the screws 81, 83 are positioned on the platform 79 along a line which is substantially parallel to the guide 105. Adjustment of these two screws determines the elevation and tilt of the guide 105 and therefore controls the position of the stylus 39 relative to the base 35. Adjustment of the remaining screw 85 determines the elevation of the second permanent magnet 77, its effect on the guide 105 being minimal.

At the other end of the platform 79, the free ends of a plurality of substantially straight bristles extend in directions substantially perpendicular to the direction of stylus housing 37 travel. The bristles are secured at their opposite ends in a holder 95 mounted to the platform 79, the bristles forming a brush 96. A well 97 (FIG. 3) is formed in the base 87 beneath brush 96. Additional holes 98, 99 are provided in base 87 for reception of bolts (not shown) to secure the base 87 in an appropriate location to one side of the turntable 33 of the player. When the stylus housing 37 is in the off-record rest position, the attraction of the arm rest mounted magnet 75 by the platform mounted magnet 77 disposes the stylus arm 45 in the lowered position (shown in FIG. 2) with the second small projection 58 provided on the bottom of the plastic stylus holder 47 being supported by a guide 105 provided on the platform 79. The second small projection 58 has a flat bottom to assure proper attitude of the stylus arm when supported by the guide 105.

When the stylus housing 37 moves from the off-record rest position to one of the above-record playback positions, the arm rest mounted magnet 75 is moved away from the vicinity of the effective magnetic field of the second magnet 77. With the decrease of the magnetic attractive force between the two permanent magnets below a given force level, the leaf spring 71 overcomes the remaining magnetic attractive force to lift the stylus arm rest 73 to the elevated position allowing the stylus 39 to clear the outer bead of the record 31.

As shown in the assembly side view of FIG. 4, a desired location of the cleaner assembly in the player places the brush 96 and guide 105 in the path of travel of the stylus housing 37 from the vicinity of turntable 33 to its rest position. A portion of the stylus housing 37 is shown in section in FIG. 4, including the housing bottom 107 and a portion of outer wall 109, at a point (in the housing travel to a rest position) just prior to the engagement of the stylus 39 with the brush 96.

For the stylus housing location shown in dashed lines in FIG. 4, the stylus 39' appears retracted within housing 37' (above bottom opening 111') due to an elevated position of its stylus arm rest 73. At a subsequent point in the passage of housing 37 to its rest position, the magnetically actuated lowering of stylus arm 45 is effected allowing stylus 39 to drop through opening 111 such that the second small projection 58, provided on the bottom of the plastic stylus holder 47, will come into engagement with the guide 105. As housing travel continues, the stylus arm 45 slides over the length of guide 105, being propelled by the stonewall 55, until reaching its rest position (illustratively in alignment with dashed line "r"). During the sliding travel of the stylus arm 45 along guide 105, the stylus 39 passes through the bristles of brush 96. During housing rest, the stylus end of arm 45 is supported by guide 105. The guide elevation is chosen so that stylus 39 is supported by the second projection 58 at an elevation substantially matching that of the grooved surface of the turntable-supported disc record 31.

The edge of guide 105 which is near the turntable 33 is beveled, such as at 112, to facilitate stylus arm 45 set-down on the guide 105.

When a playback cycle is commenced, the cleaning process described above again occurs in a reversed sequence. Stylus arm 45 slidably travels over the length of the guide 105 from location "r," being propelled by the stonewall 56, as housing 37 moves away from its rest position and the stylus 39 passes through the bristles of brush 96.

What is claimed is:

1. In a playback system for recovering prerecorded information from a spirally grooved record disposed on a turntable rotatably mounted with respect to a base of said system; said system including a stylus housing mounted for lateral travel with respect to said base between an off-turntable rest position and above-turntable playback positions; a groove riding stylus secured to one end of a stylus arm; the end of said stylus arm remote from said one end being secured to a support member mounted within said stylus housing via a compliant coupler; an apparatus comprising:

a stylus arm rest mounted in said stylus housing for motion between an elevated position and a depressed position;

a first permanent magnet mounted on said stylus arm rest;

selectively energized first actuating means including a stationary element means for generating a first field of magnetic flux, mounted within said stylus housing and cooperating with said first permanent magnet when energized, said first permanent magnet being positioned in close proximity to said first field of magnetic flux when said stylus arm rest is in said elevated position, for moving said stylus arm rest from said elevated position to said depressed position;

means for selectively energizing said selectively energized first actuating means when said housing is in said playback positions;

said energizing means serving to provide a given polarity of energization of said magnetic flux generating means; the orientation of said first permanent magnet relative to said magnetic flux generating means being such that said first permanent magnet is repelled away from said magnetic flux generating means during said energization of said given polarity to cause motion of said stylus arm rest from said elevated position to said depressed position;

second actuating means including a second permanent magnet secured on said base beneath the rest position of said stylus housing and cooperating with said first permanent magnet during housing occupancy of said rest position and during travel of said housing between said rest position and an intermediate position between said rest position and said playback positions for causing said stylus arm rest to assume said depressed position during said housing occupancy of said rest position and during said travel of said stylus housing between said intermediate position and said rest position;

said second permanent magnet serving to provide a second field of magnetic flux; the orientation of said first permanent magnet relative to said second permanent magnet being such that said first permanent magnet is attracted towards said second permanent magnet during travel of said stylus housing between said intermediate and said off-record rest position, to cause motion of said stylus arm rest from said elevated position to said depressed position; and means for moving said stylus arm rest from said depressed position to said elevated position in the absence of said energization during travel of said housing between said intermediate position and said playback positions.

2. Apparatus in accordance with claim 1 further comprising:

a brush including a holder and a plurality of bristles secured in said holder; and height adjustable platform means for supporting said holder in a location in proximity to said turntable beneath the path of travel of said stylus during stylus housing travel between said rest and playback positions and at an elevation allowing stylus engagement with said bristles during such travel.

3. Apparatus in accordance with claim 2 further comprising:

guide means, supported by said platform means, for slidably engaging said stylus arm during travel of said stylus housing between said rest position and said intermediate position to establish the position of said stylus during such travel at an elevation ensuring stylus engagement with said bristles.

4. Apparatus in accordance with claim 3 wherein said second permanent magnet is mounted on said platform means.

5. In a disc record player including a turntable for rotatably supporting a disc record during playback; and a pickup stylus subject to engagement with a record surface during said playback, said stylus being supported at one end of a pickup arm, the opposite end of said pickup arm being pivotally mounted in a stylus housing which is subject to translatory travel between a rest position clear of said turntable and playback positions over said turntable, the apparatus comprising the combination of:

a brush comprising a holder, and a plurality of bristles secured in said holder;

height adjustable platform means for supporting said holder in a location in proximity to said turntable and in spaced apart relationship to said rest position beneath the path of travel of said stylus housing between said rest and playback positions;

means for controlling the rotation of said pickup arm about an axis substantially parallel to the disc supporting surface of said turntable in a manner causing said stylus to protrude from said housing during travel of said stylus housing between said rest position and an intermediate position between said rest position and said playback positions;

said arm rotation controlling means comprising:

a stylus arm rest mounted in said stylus housing for motion between an elevated position and a depressed position;

a first permanent magnet mounted on said stylus arm rest;

selectively energized first actuating means including a stationary element means for generating a first field of magnetic flux, mounted within said stylus housing and cooperating with said first permanent magnet when energized, said first permanent magnet being positioned in close proximity to said first field of magnetic flux when said stylus arm rest is in said elevated position, for moving said stylus arm rest from said elevated position to said depressed position;

means for selectively energizing said selectively energized first actuating means when said housing is in said playback positions;

said energizing means serving to provide a given polarity of energization of said magnetic flux generating means; the orientation of said first permanent magnet relative to said magnetic flux generating means being such that said first permanent magnet is repelled away from said magnetic flux generating means during said energization of said given polarity to cause motion of said stylus arm rest from said elevated position to said depressed position;

second actuating means, including a second permanent magnet, secured on said platform means and cooperating with said first permanent magnet during housing occupancy of said rest position and during travel of said housing between said rest position and an intermediate position between said rest position and said playback positions for causing said stylus arm rest to assume said depressed position during said housing occupancy of said rest position and during said travel of said stylus housing between said intermediate position and said rest position;

said second permanent magnet serving to provide a second field of magnetic flux; the orientation of said first permanent magnet relative to said second permanent magnet being such that said first permanent magnet is attracted towards said second permanent magnet during travel of said stylus housing between said intermediate and said off-record rest position, to cause motion of said stylus arm rest from said elevated position to said depressed position;

means for moving said stylus arm rest from said depressed position to said elevated position in the absence of said energization during travel of said housing between said intermediate position and said playback positions; and guide means, supported by said platform means, engaging said pickup arm during travel of said stylus housing between said rest position and said intermediate position to establish the position of said protruding stylus during such travel at an elevation ensuring stylus engagement with said bristles.

6. Apparatus as recited in claim 5 wherein;

said rotation controlling means maintains said stylus protrusion during housing occupancy of said rest position; and the elevation of said guide means established by said platform means is so related to the elevation of said disc supporting turntable surface that said stylus is supported by said rigid guide means, during housing occupancy of said rest position, at an elevation substantially corresponding to the elevation of said stylus obtained during said record surface engagement.

7. Apparatus in accordance with claim 6 wherein said second permanent magnet is mounted on said platform means in proximity to said opposite end of said pickup arm.

8. Apparatus as recited in claim 7 further comprising means for selectively altering the height of said second permanent magnet relative to the height of said rigid guide means.

* * * * *